United States Patent
Ghahramani et al.

(10) Patent No.: US 9,831,960 B2
(45) Date of Patent: Nov. 28, 2017

(54) SYSTEMS AND METHODS FOR REDUCING TRANSMISSION INTERFERENCE

(71) Applicant: QUALCOMM Incorporated, San Diego, CA (US)

(72) Inventors: Mohammad Mahdi Ghahramani, San Jose, CA (US); Mazhareddin Taghivand, Campbell, CA (US); Rainer Gaethke, San Francisco, CA (US); Niranjan Anand Talwalkar, San Jose, CA (US); Roger Brockenbrough, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 539 days.

(21) Appl. No.: 14/562,255

(22) Filed: Dec. 5, 2014

(65) Prior Publication Data
US 2016/0164617 A1    Jun. 9, 2016

(51) Int. Cl.
| | | |
|---|---|---|
| H04B 1/10 | (2006.01) | |
| H04B 15/02 | (2006.01) | |
| H04B 5/00 | (2006.01) | |
| H04W 88/06 | (2009.01) | |

(52) U.S. Cl.
CPC .......... H04B 15/02 (2013.01); H04B 5/0031 (2013.01); H04B 5/0075 (2013.01); H04W 88/06 (2013.01)

(58) Field of Classification Search
CPC .... H04B 15/02; H04B 5/0031; H04B 5/0075; H04B 1/10; H04W 88/06
See application file for complete search history.

(56) References Cited

U.S. PATENT DOCUMENTS

| | | |
|---|---|---|
| 7,580,691 B1 | 8/2009 | Reed et al. |
| 7,917,115 B2 | 3/2011 | Baker |
| 8,036,308 B2 | 10/2011 | Rofougaran |
| 8,131,230 B2 | 3/2012 | Xhafa et al. |
| 8,472,873 B2 | 6/2013 | Tzoreff et al. |
| 2009/0261976 A1 | 10/2009 | Oung et al. |
| 2009/0275358 A1 | 11/2009 | Feltgen et al. |

(Continued)

FOREIGN PATENT DOCUMENTS

EP    2337231 A1    6/2011

OTHER PUBLICATIONS

International Search Report and Written Opinion—PCT/US2015/059010—ISA/EPO—Jan. 29, 2016.

*Primary Examiner* — Nguyen Vo
(74) *Attorney, Agent, or Firm* — Austin Rapp

(57) ABSTRACT

A method for inductively coupled communication is described. The method includes generating a first signal. The first signal frequency is a first integer multiple of a carrier frequency for inductively coupled communication. The method also includes selecting between a standalone mode and a coexistence mode. The method further includes dividing the first signal to obtain a second signal when in standalone mode. The second signal frequency is a second integer multiple of the carrier frequency. The method additionally includes dividing the first signal to obtain a third signal when in coexistence mode. The third signal frequency is a third integer multiple of the carrier frequency. The method also includes generating an inductively coupled communication signal using at least one of the second signal and the third signal.

30 Claims, 10 Drawing Sheets

(56) References Cited

U.S. PATENT DOCUMENTS

| | | |
|---|---|---|
| 2010/0137025 A1 | 6/2010 | Tal et al. |
| 2010/0190436 A1 | 7/2010 | Cook et al. |
| 2010/0272222 A1 | 10/2010 | Mitani et al. |
| 2012/0154010 A1 | 6/2012 | Singhal et al. |
| 2013/0081261 A1* | 4/2013 | Pienkowski ........... H01Q 7/005 29/600 |
| 2014/0273843 A1* | 9/2014 | Gimeno Monge .. H04B 1/1027 455/41.1 |
| 2014/0329462 A1 | 11/2014 | Khorram et al. |
| 2015/0072623 A1* | 3/2015 | Mofidi ................... H04B 15/02 455/63.3 |

* cited by examiner

SYSTEMS AND METHODS FOR REDUCING TRANSMISSION INTERFERENCE

TECHNICAL FIELD

The present disclosure relates generally to signal processing. More specifically, the present disclosure relates to systems and methods for reducing transmission interference.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Many electronic devices may make use of multiple different technologies. For example, an electronic device may include an FM receiver in addition to transceivers for other communication technologies. These technologies may experience interference when used concurrently. For example, an FM receiver may experience desensitization during concurrent use with a near field communication (NFC) radio. Benefits may be realized by reducing the interference between communication technologies.

SUMMARY

A method for inductively coupled communication is described. The method includes generating a first signal. The first signal frequency is a first integer multiple of a carrier frequency for inductively coupled communication. The method also includes selecting between a standalone mode and a coexistence mode. The method further includes dividing the first signal to obtain a second signal when in standalone mode. The second signal frequency is a second integer multiple of the carrier frequency. The method additionally includes dividing the first signal to obtain a third signal when in coexistence mode. The third signal frequency is a third integer multiple of the carrier frequency. The method also includes generating an inductively coupled communication signal using at least one of the second signal and the third signal.

Selecting between the standalone mode and the coexistence mode may include selecting standalone mode when performing inductively coupled communication transmission without an FM reception. Coexistence mode may be selected when performing inductively coupled communication transmission during FM reception.

When the coexistence mode is selected, generating the inductively coupled communication signal may include converting the third signal to the inductively coupled communication signal using a 28-bit waveform generator lookup table. A frequency of the inductively coupled communication signal is the carrier frequency. A seventh harmonic of the inductively coupled communication signal is canceled using the 28-bit waveform generator lookup table.

When the standalone mode is selected, generating the inductively coupled communication signal may include converting the second signal to the inductively coupled communication signal using a 32-bit waveform generator lookup table.

The method may also include generating a physical clock signal with a frequency that is an integer multiple of the carrier frequency. The physical clock signal may be generated by dividing the second signal or third signal based on the selected mode. A digital clock signal may be generated with a frequency that is an integer multiple of the carrier frequency. The digital clock signal may be generated by dividing the physical clock signal.

Dividing the first signal to obtain either the second signal or the third signal may include adjusting one or more programmable dividers based on the selected mode.

The inductively coupled communication may be near field communication (NFC). The carrier frequency may be 13.56 megahertz (MHz), the first signal frequency may be 6074.88 MHz, the second signal frequency may be 433.92 MHz and the third signal frequency may be 379.68 MHz.

Circuitry for inductively coupled communication is also described. The circuitry includes a signal generator that generates a first signal. The first signal frequency is a first integer multiple of a carrier frequency for inductively coupled communication. The circuitry also includes a mode selection module that selects between a standalone mode and a coexistence mode. The circuitry further includes a standalone divider that divides the first signal to obtain a second signal when in standalone mode. The second signal frequency is a second integer multiple of the carrier frequency. The circuitry additionally includes a coexistence divider that divides the first signal to obtain a third signal when in coexistence mode. The third signal frequency is a third integer multiple of the carrier frequency. The circuitry also includes an inductively coupled communication signal generator that generates an inductively coupled communication signal using at least one of the second signal and the third signal.

An apparatus for inductively coupled communication is also described. The apparatus includes means for generating a first signal. The first signal frequency is a first integer multiple of a carrier frequency for inductively coupled communication. The apparatus also includes means for selecting between a standalone mode and a coexistence mode. The apparatus further includes means for dividing the first signal to obtain a second signal when in standalone mode. The second signal frequency is a second integer multiple of the carrier frequency. The apparatus additionally includes means for dividing the first signal to obtain a third signal when in coexistence mode. The third signal frequency is a third integer multiple of the carrier frequency. The apparatus also includes means for generating an inductively coupled communication signal using at least one of the second signal and the third signal.

A computer-program product for inductively coupled communication is also described. The computer-program product includes a non-transitory tangible computer-readable medium having instructions thereon. The instructions include code for causing an electronic device to generate a first signal. The first signal frequency is a first integer multiple of a carrier frequency for inductively coupled communication. The instructions also include code for causing the electronic device to select between a standalone mode and a coexistence mode. The instructions further include code for causing the electronic device to divide the first signal to obtain a second signal when in standalone mode. The second signal frequency is a second integer multiple of the carrier frequency. The instructions additionally include code for causing the electronic device to divide the first signal to obtain a third signal when in coexistence mode. The third signal frequency is a third integer multiple of the carrier frequency. The instructions also include code for causing the electronic device to generate an inductively coupled communication signal using at least one of the second signal and the third signal.

DETAILED DESCRIPTION

The systems and methods disclosed herein may be applied to electronic devices that communicate wirelessly and/or that communicate using a wired connection or link. For example, some electronic devices may communicate with other devices using an Ethernet protocol. In one configuration, the systems and methods disclosed herein may be applied to a communication device that communicates with another device using an inductively coupled communication technology. One implementation of an inductively coupled communication technology is near-field communication (NFC).

The rise of NFC technology and increased user demand for enhanced FM broadcast receiver (Rx) performance in electronic devices (e.g., mobile devices) has created a potential challenge for coexistence. As used herein, the term "coexistence" refers to the simultaneous (e.g., concurrent) operation of an FM receiver and an inductively coupled communication transceiver, such as an NFC transceiver, on an electronic device. In some scenarios, one or more harmonics of a transmission by the inductively coupled communication technology may fall within an FM broadcast band (e.g., 76-108 megahertz (MHz)). These harmonics may interfere with (also referred to herein as desense or desensitize) an FM channel and may potentially interfere with adjacent FM channels.

One approach to coexistence of an FM receiver and an inductively coupled communication transceiver is to mask the interference. For example, when the inductively coupled communication transceiver is transmitting, the interference caused by a harmonic of the transmission on the FM receiver may be audible to the listener. During times of interference, an electronic device may mute the FM signal and play a prerecorded sound to mask the interference. However, this approach limits full coexistence and may result in a highly degraded FM audio quality and channel efficiency. These problems are especially pronounced in countries with limited FM broadcast stations.

Various configurations are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the Figures, is not intended to limit scope, as claimed, but is merely representative of the systems and methods.

Figure 1:
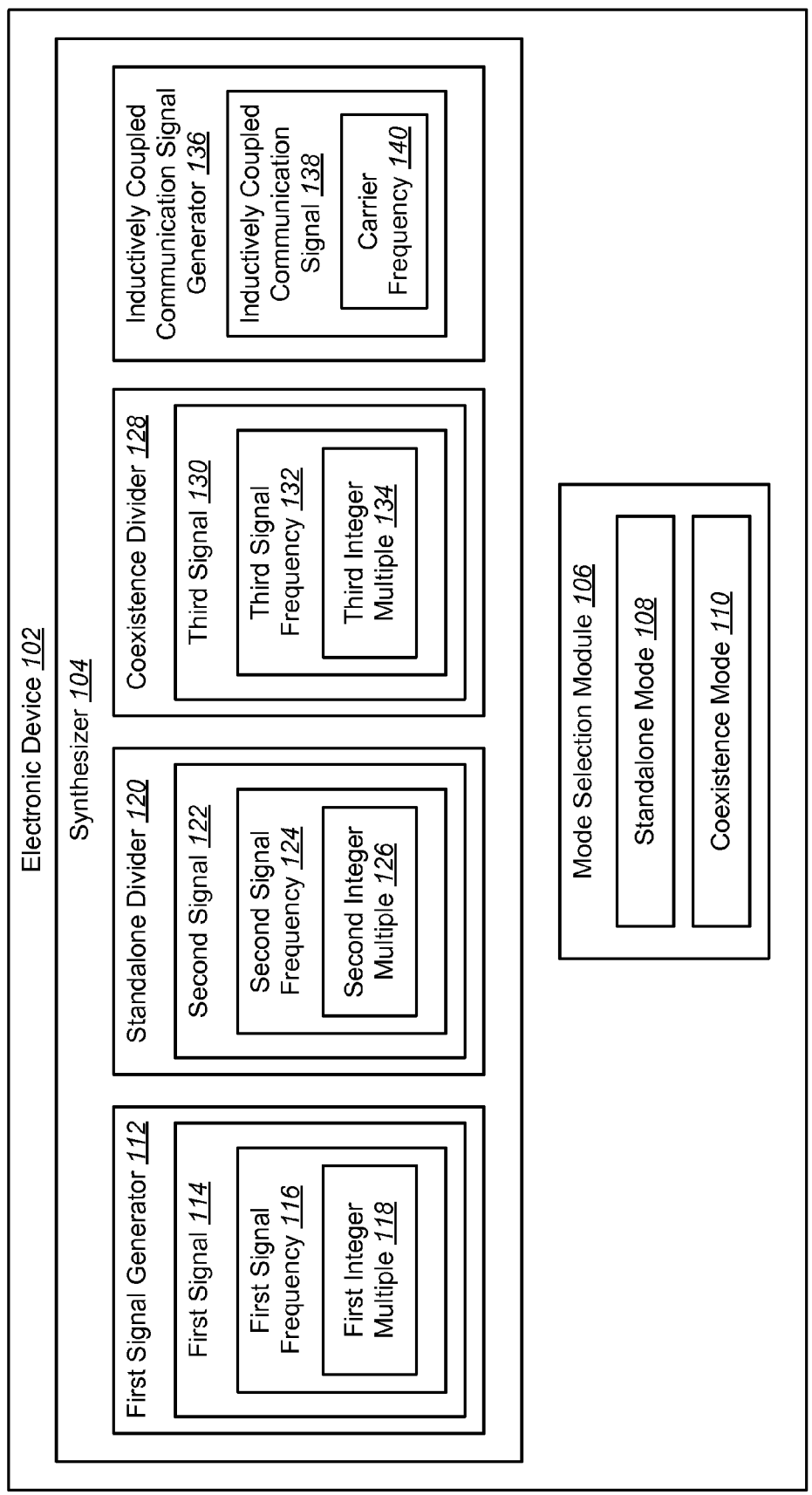
FIG. 1 is a block diagram illustrating one configuration of an electronic device in which systems and methods for reducing transmission interference may be implemented.

FIG. 1 is a block diagram illustrating one configuration of an electronic device 102 in which systems and methods for reducing transmission interference may be implemented. Wireless communication systems are widely deployed to provide various types of communication content such as voice, data, and so on. An electronic device 102 may utilize multiple communication technologies that may operate simultaneously (e.g., concurrently). For example, an electronic device 102 may include an FM receiver that may receive an FM broadcast. The wireless communication device 102 may also include an inductively coupled communication transceiver that may transmit and receive inductive signals.

The inductively coupled communication transceiver may transmit a signal to another electronic device 102 via an antenna. In one configuration, the inductively coupled communication technology may be near-field communication (NFC). In NFC, the carrier frequency 140 of a transmission is specified to be 13.56 megahertz (MHz). An NFC carrier frequency 140 shift of +/−7 kilohertz (kHz) is permitted by specification.

An inductively coupled communication signal 138 may be generated by a pulse width modulation (PWM) signal that switches between the supply voltage and ground. An inductively coupled communication signal 138 constructed using a PWM may have a high odd harmonic content. In the case of NFC, the 7th harmonic (13.56 MHz*7=94.92 MHz) may fall on the FM band.

In one approach, an inductively coupled communication signal 138 may be produced using coded bits that are converted to a square wave through a 32-bit 433.92 MHz waveform generator lookup table (LUT). The 32-bit 433.92 MHz waveform generator LUT may result in a large 7th harmonic. This 7th harmonic may interfere with FM reception during inductively coupled communication transmission.

In another approach, the electronic device 102 may produce the inductively coupled communication signal 138 using coded bits that are converted to a square wave through a 28-bit 379.68 MHz waveform generator lookup table (LUT). The 7th harmonic of the inductively coupled communication signal 138 can be canceled using the 28-bit 379.68 MHz waveform generator LUT. Therefore, synthesizing the inductively coupled communication signal 138 with the 28-bit 379.68 MHz waveform generator LUT may reduce or eliminate interference of the FM reception caused by the 7th harmonic of the inductively coupled communication transmission.

However, it may be desirable to retain the higher frequency waveform generator LUT when the electronic device 102 is operating without FM reception. The inductively coupled communication signal 138 generated by a higher frequency waveform generator LUT may have more phase accuracy. For example, a 32-bit waveform generator LUT will have greater phase accuracy than a 28-bit waveform generator LUT. With greater phase accuracy, the electronic device 102 may synthesize better low frequency signals, such as the inductively coupled communication signal 138.

Benefits may be realized by selecting between a 32-bit waveform generator LUT or a 28-bit waveform generator LUT for inductively coupled communication signal 138 generation. The electronic device 102 may generate the inductively coupled communication signal 138 using the 32-bit waveform generator LUT when performing inductively coupled communication transmission without an FM reception. This may provide desirable phase accuracy for the inductively coupled communication signal 138 synthesis. The electronic device 102 may generate the inductively coupled communication signal 138 using the 28-bit waveform generator LUT when performing inductively coupled communication transmission during FM reception, which may cancel the 7th harmonic of the inductively coupled communication signal 138.

The electronic device 102 may include a synthesizer 104 and a mode selection module 106. In one configuration, the synthesizer 104 and the mode selection module 106 may be included in an integrated circuit. In another configuration, the synthesizer 104 and the mode selection module 106 may be separate components of the electronic device 102.

The synthesizer 104 may include a first signal generator 112. In one configuration, the first signal generator 112 may include an inductor capacitor (LC) voltage controlled oscillator (VCO) as part of a phase locked loop (PLL). The first signal generator 112 may generate a first signal 114 with a certain frequency (e.g., the first signal frequency 116). The first signal frequency 116 may be a first integer multiple 118 of the carrier frequency 140 for inductively coupled communication. In the case of NFC, the carrier frequency 140 may be 13.56 MHz. The first signal frequency 116 may be 6074.88 MHz. In this case, the first integer multiple 118 for the first signal frequency 116 is 448 (i.e., 13.56 MHz*448=6074.88 MHz).

The mode selection module 106 may select between a standalone mode 108 and a coexistence mode 110. The mode selection module 106 may select standalone mode 108 when performing inductively coupled communication transmission without an FM reception. The mode selection module 106 may select coexistence mode 110 when performing inductively coupled communication transmission during FM reception.

A standalone divider 120 may divide the first signal 114 to obtain a second signal 122 when in standalone mode 108. The second signal frequency 124 may be a second integer multiple 126 of the carrier frequency 140. In the case of NFC, the first signal frequency 116 may be 6074.88 MHz. The standalone divider 120 may divide the first signal 114 by 14, which results in a second signal frequency 124 of 433.92 MHz. In this case, the second integer multiple 126 of the carrier frequency 140 is 32 (i.e., 13.56 MHz*32=433.92 MHz).

A coexistence divider 128 may divide the first signal 114 to obtain a third signal 130 when in coexistence mode 110. The third signal frequency 132 may be a third integer multiple 134 of the carrier frequency 140. In the case of NFC, the first signal frequency 116 may be 6074.88 MHz. The standalone divider 120 may divide the first signal 114 by 16, which results in a third signal frequency 132 of 379.68 MHz. In this case, the third integer multiple 134 of the carrier frequency 140 is 28 (i.e., 13.56 MHz*28=379.68 MHz).

An inductively coupled communication signal generator 136 may generate the inductively coupled communication signal 138 using at least one of the second signal 122 and the third signal 130. The frequency of the inductively coupled communication signal 138 is the carrier frequency 140 for inductively coupled communication. As described above, in the case of NFC, the carrier frequency 140 is 13.56 MHz.

When standalone mode 108 is selected, the inductively coupled communication signal generator 136 may convert the second signal 122 to the inductively coupled communication signal 138 using a 32-bit waveform generator LUT. When the coexistence mode 110 is selected, the inductively coupled communication signal generator 136 may convert the third signal 130 to the inductively coupled communication signal 138 using a 28-bit waveform generator LUT. The seventh harmonic of the inductively coupled communication signal 138 is canceled using the 28-bit waveform generator LUT. The operation of the 28-bit waveform generator LUT is described in connection with FIG. 7.

Figure 2:
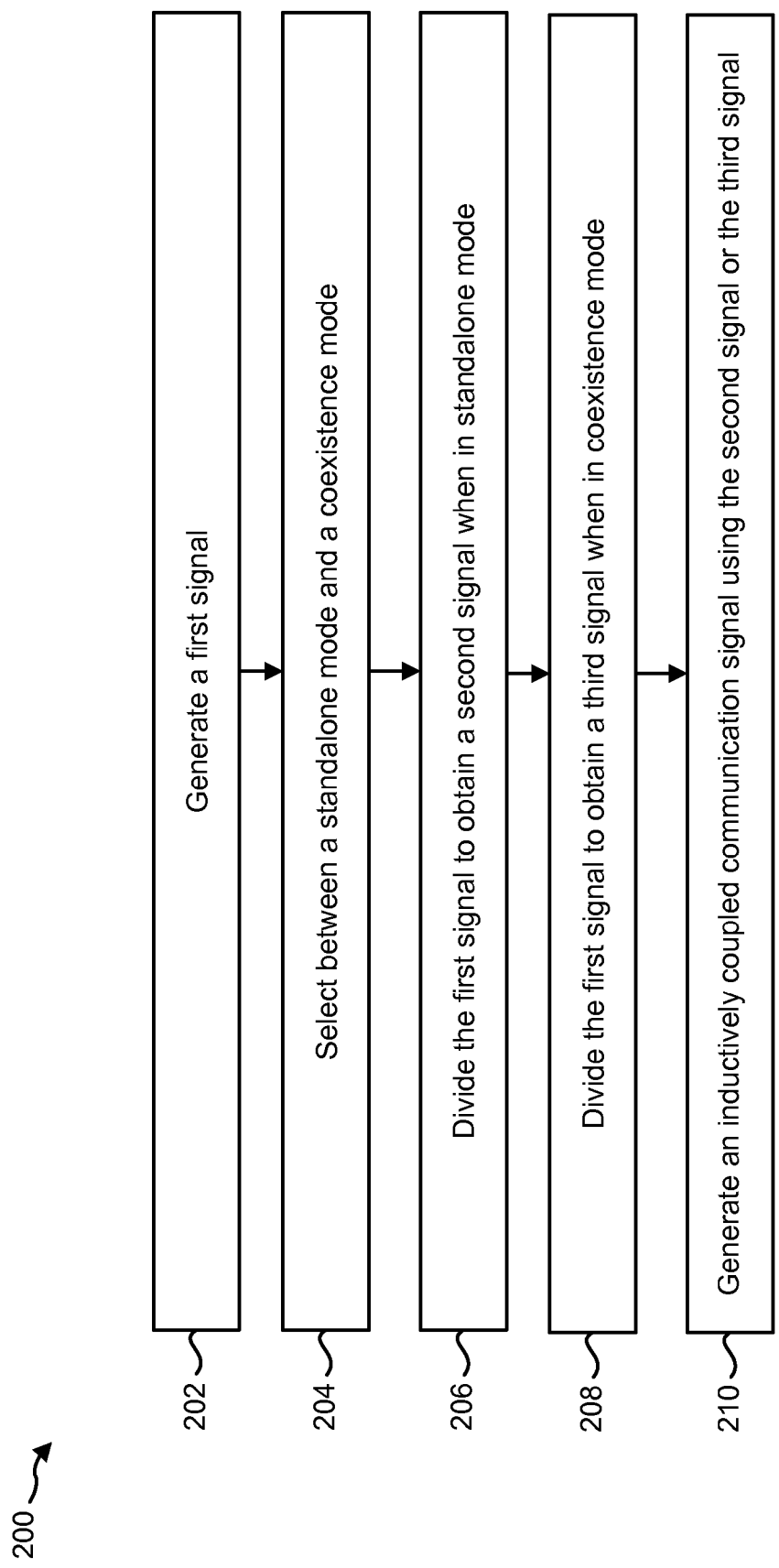
FIG. 2 is a flow diagram illustrating one configuration of a method for reducing transmission interference.

FIG. 2 is a flow diagram illustrating one configuration of a method 200 for reducing transmission interference. In one implementation, an electronic device 102 may perform the method 200 illustrated in FIG. 2 in order to mitigate FM desensitization by inductively coupled communication. In one case, the inductively coupled communication may be near-field communication (NFC).

The electronic device 102 may generate 202 a first signal 114. For example, the electronic device 102 may generate 202 the first signal 114 using an inductor capacitor (LC) voltage controlled oscillator (VCO) as part of a phase locked loop (PLL). The first signal 114 may have a first signal frequency 116 that is a first integer multiple 118 of the carrier frequency 140 for inductively coupled communication. In the case of NFC, the carrier frequency 140 may be 13.56 MHz. In this case, the first integer multiple 118 of the carrier frequency 140 may be 448. Therefore, the first signal frequency 116 may be 6074.88 MHz (i.e., 13.56 MHz*448=6074.88 MHz).

The electronic device 102 may select 204 between a standalone mode 108 and a coexistence mode 110. The electronic device 102 may select 204 standalone mode 108 when performing inductively coupled communication transmission without an FM reception. For example, if the electronic device 102 is performing an NFC transmission without an FM reception, the electronic device 102 may select 204 standalone mode 108.

The electronic device 102 may select 204 coexistence mode 110 when performing inductively coupled communication transmission during FM reception. For example, if the electronic device 102 is performing an NFC transmission while an FM receiver is operational, the electronic device 102 may select 204 coexistence mode 110.

The electronic device 102 may divide 206 the first signal 114 to obtain a second signal 122 when in standalone mode 108. The second signal frequency 124 may be a second integer multiple 126 of the carrier frequency 140. In the case of NFC, the first signal frequency 116 may be 6074.88 MHz. The electronic device 102 may divide 206 the first signal 114 by 14, which results in a second signal frequency 124 of 433.92 MHz. In this case, the second integer multiple 126 of the carrier frequency 140 is 32 (i.e., 13.56 MHz*32=433.92 MHz).

The electronic device 102 may divide 208 the first signal 114 to obtain a third signal 130 when in coexistence mode 110. The third signal frequency 132 may be a third integer multiple 134 of the carrier frequency 140. In the case of NFC, the first signal frequency 116 may be 6074.88 MHz. The electronic device 102 may divide 208 the first signal 114 by 16, which results in a third signal frequency 132 of 379.68 MHz. In this case, the third integer multiple 134 of the carrier frequency 140 is 28 (i.e., 13.56 MHz*28=379.68 MHz).

The electronic device 102 may divide the first signal 114 to obtain either the second signal 122 or the third signal 130 by adjusting one or more programmable dividers based on the selected mode. In one configuration, a single programmable divider may be switched to produce either the second signal 122 or the third signal 130 based on the selected mode. In another configuration, multiple programmable dividers may be used to produce the second signal 122 or the third signal 130.

The electronic device 102 may generate 210 an inductively coupled communication signal 138 using at least one of the second signal 122 or the third signal 130. The frequency of the inductively coupled communication signal 138 is the carrier frequency 140 for inductively coupled communication.

When standalone mode 108 is selected, the electronic device 102 may convert the second signal 122 to the inductively coupled communication signal 138 using a 32-bit waveform generator LUT. When the coexistence mode 110 is selected, the electronic device 102 may convert the third signal 130 to the inductively coupled communication signal 138 using a 28-bit waveform generator LUT. The seventh harmonic of the inductively coupled communication signal 138 is canceled using the 28-bit waveform generator LUT. The operation of the 28-bit waveform generator LUT is described in connection with FIG. 7.

Figure 3:
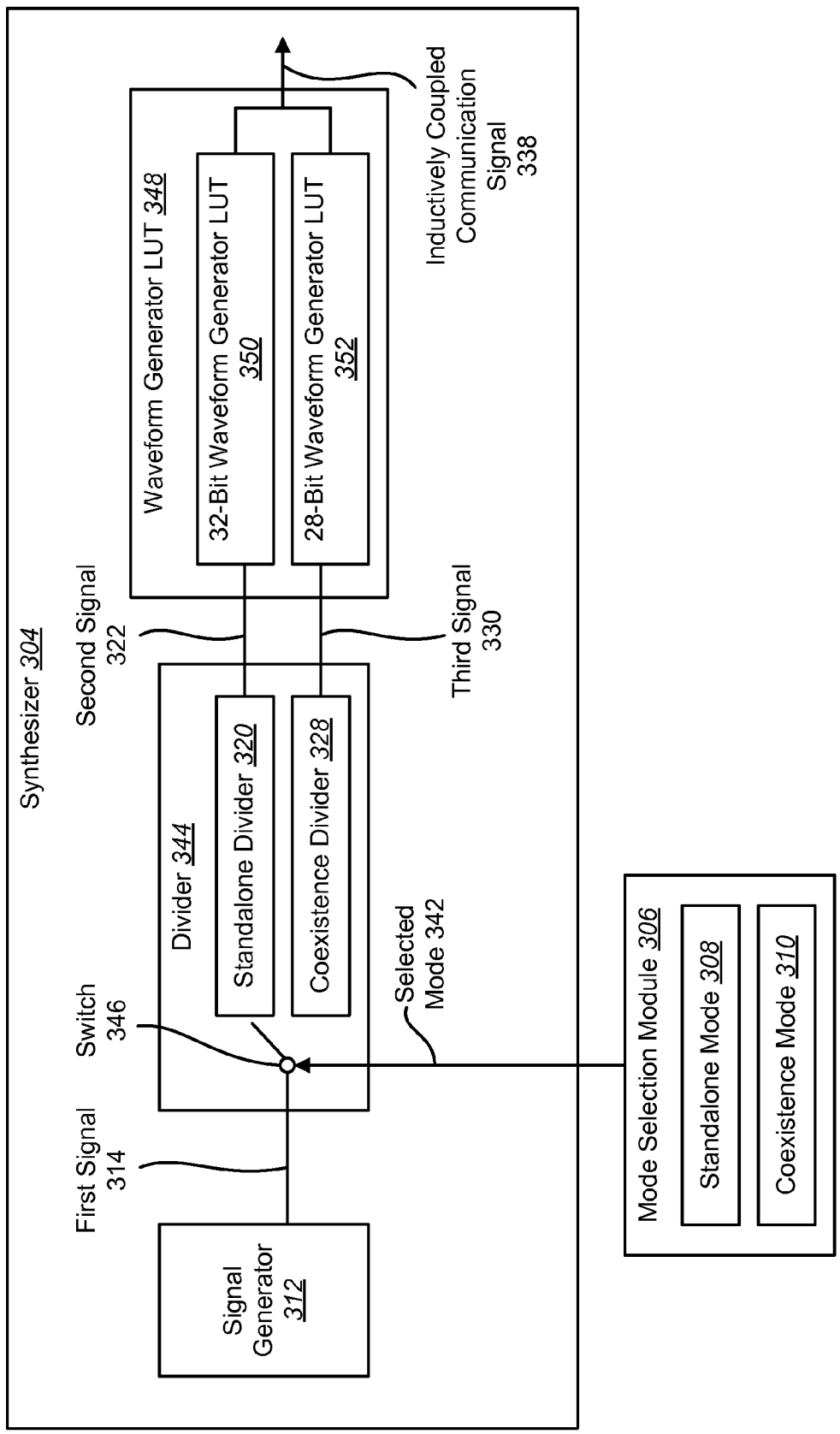
FIG. 3 is a block diagram illustrating one configuration of a synthesizer and a mode selection module for reducing transmission interference.

FIG. 3 is a block diagram illustrating one configuration of a synthesizer 304 and a mode selection module 306 for reducing transmission interference. The synthesizer 304 and the mode selection module 306 may be included in an electronic device 102 as described above in connection with FIG. 1. The synthesizer 304 may produce an inductively coupled communication signal 338 based on whether the electronic device 102 is operating in a standalone mode 308 or a coexistence mode 310. The components described in connection with FIG. 3 may be implemented in hardware (e.g., circuitry), software or a combination of both.

The mode selection module 306 may select between the standalone mode 308 and a coexistence mode 310. The mode selection module 306 may select standalone mode 308 when performing inductively coupled communication transmission without an FM reception. The mode selection module 306 may select coexistence mode 310 when performing inductively coupled communication transmission during FM reception.

The mode selection module 306 may be coupled to the synthesizer 304. The mode selection module 306 may provide a selected mode 342 signal to the synthesizer 304 that indicates whether the standalone mode 308 or the coexistence mode 310 is selected.

The synthesizer 304 may include a signal generator 312 that produces a first signal 314. The signal generator 312 may include an inductor capacitor (LC) voltage controlled oscillator (VCO) as part of a phase locked loop (PLL).

The first signal frequency 116 is an integer multiple 118 of an inductively coupled communication carrier frequency 140. In the case when the inductively coupled communication is near-field communication (NFC), the first signal 314 may have a first signal frequency 116 that is an integer multiple of the NFC carrier frequency 140. For example, the first signal frequency 116 may be 448 times the NFC carrier frequency 140 of 13.56 MHz. In other words, the first signal frequency 116 may be the 448th harmonic of the NFC carrier frequency 140. In this case, the first signal frequency 116 is 6074.88 MHz.

The signal generator 312 may be coupled to a divider 344. The divider 344 may include a standalone divider 320 and a coexistence divider 328. In one configuration, the divider 344 may include a switch 346 that selects between the standalone divider 320 and the coexistence divider 328 based on the selected mode 342. When the selected mode 342 is standalone mode 308, the switch 346 may select the standalone divider 320. When the selected mode 342 is coexistence mode 310, the switch 346 may select the coexistence divider 328.

The standalone divider 320 may divide the first signal 314 to obtain a second signal 322. The second signal frequency 124 may be a second integer multiple 126 of the carrier frequency 140. In the case of NFC, the first signal frequency 116 may be 6074.88 MHz. The standalone divider 320 may divide the first signal 114 by 14, which results in a second signal frequency 124 of 433.92 MHz. In this case, the second integer multiple 126 of the carrier frequency 140 is 32 (i.e., 13.56 MHz*32=433.92 MHz). In other words, the second signal frequency 124 may be the 32nd harmonic of the NFC carrier frequency 140.

The coexistence divider 328 may divide the first signal 314 to obtain a third signal 330. The third signal frequency 132 may be a third integer multiple 134 of the carrier frequency 140. In the case of NFC, the first signal frequency 116 may be 6074.88 MHz. The standalone divider 320 may divide the first signal 314 by 16, which results in a third signal frequency 132 of 379.68 MHz. In this case, the third integer multiple 134 of the carrier frequency 140 is 28 (i.e., 13.56 MHz*28=379.68 MHz). In other words, the third signal frequency 132 may be the 28th harmonic of the NFC carrier frequency 140.

The divider 344 may be coupled to a waveform generator lookup table (LUT) 348. The waveform generator LUT 348 may receive the second signal 322 and the third signal 330. The waveform generator LUT 348 may include a 32-bit waveform generator LUT 350 and a 28-bit waveform generator LUT 352 to produce the inductively coupled communication signal 338. It should be noted that both the 32-bit waveform generator LUT 350 and the 28-bit waveform generator LUT 352 generate an inductively coupled communication signal 338 with the same carrier frequency 140. In the case of NFC, the carrier frequency 140 is 13.56 MHz.

The 32-bit waveform generator LUT 350 may receive the second signal 322 when the selected mode 342 is the standalone mode 308. The 32-bit waveform generator LUT 350 may convert the second signal 322 into the inductively coupled communication signal 338 based on 32 phases.

The 28-bit waveform generator LUT 352 may receive the third signal 330 when the selected mode 342 is the coexistence mode 310. The 28-bit waveform generator LUT 352 may convert the third signal 330 into the inductively coupled communication signal 338 based on 28 phases. The 28-bit waveform generator LUT 352 may cancel the 7th harmonic of the inductively coupled communication signal 338.

It should be noted that in some implementations, a ring VCO may be used instead of an LC VCO for the signal generator 312. However, a ring VCO may not result in a satisfactory inductively coupled communication signal 338 using a 28-bit waveform generator LUT 352.

A ring VCO may operate at lower frequencies than an LC VCO. For example, a ring VCO may operate at 867.84 MHz. This may be divided by 2 to produce the 433.92 MHz second signal 322. However, in the case of coexistence mode 110, an 867.84 MHz signal must be divided by a fraction to produce the 379.68 MHz third signal 330. However, dividing the 867.84 MHz signal by a fraction may result in phase noise that does not meet specifications. Therefore, phase noise may prevent the use of a ring VCO during coexistence mode 110. A higher frequency LC VCO may provide an integer relationship between the first signal 314, the second signal 322 and the third signal 330, which may reduce phase noise.

Figure 4:
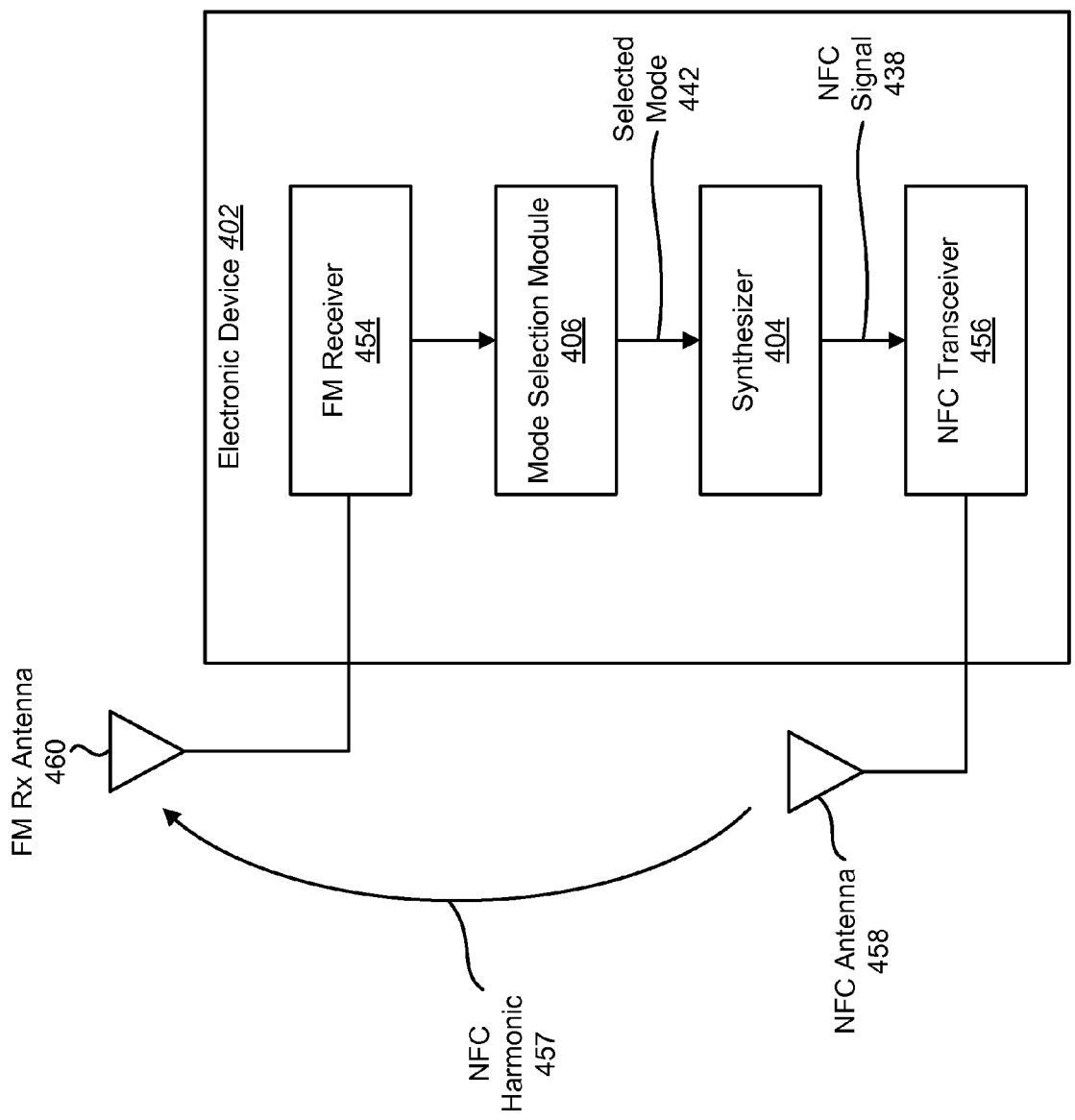
FIG. 4 is a block diagram illustrating another configuration of an electronic device in which systems and methods for reducing transmission interference may be implemented.

FIG. 4 is a block diagram illustrating another configuration of an electronic device 102 in which systems and methods for reducing transmission interference may be implemented. The electronic device 102 may include an FM receiver 454 and a near-field communication (NFC) transceiver 456.

The FM receiver 454 may receive an FM broadcast via an FM receive (Rx) antenna 460. In one configuration, the FM Rx antenna 460 may reside in a wired headset connected to the electronic device 102. The FM receiver 454 may tune the FM Rx antenna 460 to a desired FM frequency within the FM spectrum and then receive the tuned FM station. FM broadcasting may vary according to country. For example, in the United States, FM radio stations broadcast at frequencies of 87.8 to 108 MHz.

The electronic device 102 may also include an NFC transceiver 456 that transmits and receives inductive signals. The NFC transceiver 456 may establish radio communication with another electronic device 102 (e.g., a target) using magnetic induction. In one configuration, the NFC transceiver 456 may operate according to NFC protocols. The NFC transceiver 456 may include an NFC transmitter and an NFC receiver. NFC is discussed in more detail in connection with FIG. 9.

The NFC transceiver 456 may transmit an NFC signal 438 to another electronic device 102 via an NFC antenna 458. For example, an NFC transmitter may generate pulse width modulated (PMW) square signals and may send these signals to the NFC antenna 458.

One or more NFC harmonics 457 may be generated from the transmission of the NFC signal 438. A harmonic may also be referred to as a spurious emission or spur. During NFC transmission, the square waves may generate odd harmonics. An NFC harmonic 457 may be a multiple of a given transmit carrier frequency 140. For example, if the carrier frequency 140 is 13.56 MHz, as specified for NFC, the seventh harmonic of the carrier frequency 140 is 7×13.56 MHz or 94.92 MHz. The seventh NFC harmonic 457 falls in the FM broadcast band (e.g., 76-108 MHz).

When the electronic device 402 performs an NFC transmission, the seventh NFC harmonic 457 may be received by the FM Rx antenna 460 and may potentially interfere with (e.g., desense) one or more FM channels. An FM channel may be 200 kHz wide. When an NFC harmonic 457 falls on an FM operating frequency and the FM signal is weak (e.g., a weak FM station), then the user of the electronic device 402 may hear the impact of the NFC harmonic 457 on the FM channel.

The electronic device 102 may include a mode selection module 406. The mode selection module 406 may be implemented in accordance with the mode selection module 106 described in connection with FIG. 1. In one configuration, the mode selection module 406 may receive a signal from the FM receiver 454 indicating whether the FM receiver 454 is operational. The mode selection module 406 may select between a standalone mode 108 and a coexistence mode 110. The mode selection module 406 may select standalone mode 108 when performing an NFC transmission without an FM reception. Alternatively, the mode selection module 406 may select coexistence mode 110 when performing an NFC transmission during FM reception.

The mode selection module 406 may produce a selected mode 442 signal. The selected mode 442 signal may indicate whether the electronic device 402 is in standalone mode 108 or coexistence mode 110.

A synthesizer 404 may receive the selected mode 442 from the mode selection module 406. The synthesizer 404 may generate an NFC signal 438 for use by the NFC transceiver 456 based on the selected mode 442. This may be accomplished as described in connection with FIG. 5. In another configuration, the synthesizer 404 may be included inside the transceiver 456.

Figure 5:
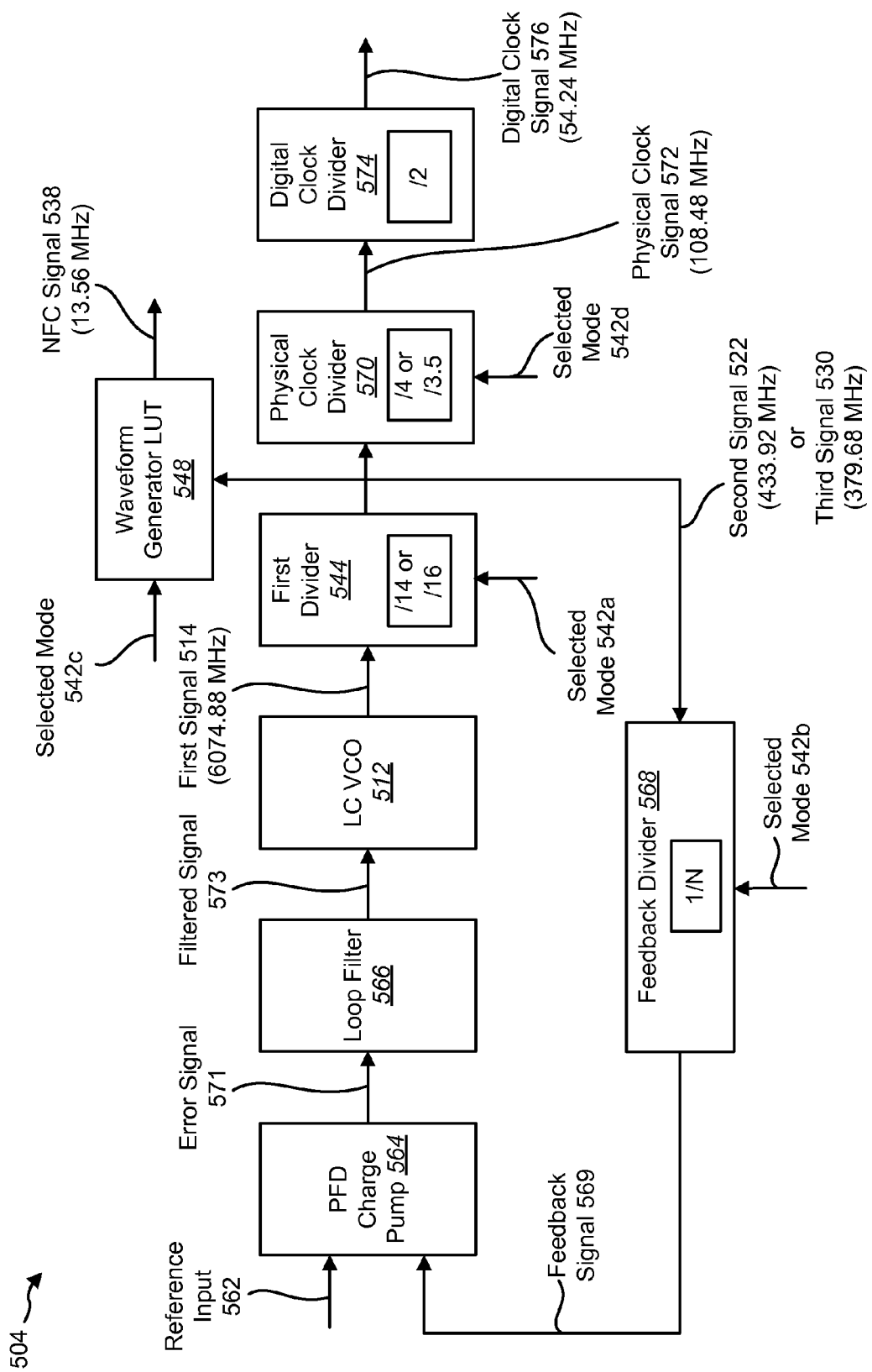
FIG. 5 is a block diagram illustrating one configuration of a synthesizer in which systems and methods for reducing transmission interference may be implemented.

FIG. 5 is a block diagram illustrating one configuration of a synthesizer 504 in which systems and methods for reducing transmission interference may be implemented. The synthesizer 504 may be included in an electronic device 402 that includes an FM receiver 454 and a near-field communication (NFC) transceiver 456.

The synthesizer 504 may produce an NFC signal 538 based on whether the electronic device 402 is operating in a standalone mode 108 or a coexistence mode 110. The components described in connection with FIG. 5 may be implemented in hardware (e.g., circuitry), software or a combination of both.

The synthesizer 504 may include a phase frequency detector (PFD) charge pump 564. The PFD charge pump 564 may receive a reference input 562 and a feedback signal 569. The PFD charge pump 564 may compare the reference input 562 and the feedback signal 569 to produce an error signal 571.

A loop filter 566 may be coupled to the PFD charge pump 564. The loop filter 566 may receive the error signal 571. The loop filter 566 may apply a low pass filter to the error signal 571 to produce a filtered signal 573.

An inductor capacitor (LC) voltage controlled oscillator (VCO) 512 may be coupled to the loop filter 566. The LC VCO 512 may be driven by the filtered signal 573 to generate a first signal 514. The first signal 514 may have a first signal frequency 116 that is a first integer multiple 118 of the NFC signal 538 carrier frequency 140 (i.e., 13.56 MHz). In the configuration depicted in FIG. 5, the first signal frequency 116 is 6074.88 MHz, which is the 448th multiple of the NFC signal 538 carrier frequency 140 (i.e., 13.56 MHz*448=6074.88 MHz).

The LC VCO 512 may be coupled to a first divider 544. The first divider 544 may divide the first signal 514 to obtain a second signal 522 or a third signal 530 based on a selected mode 542a. The first divider 544 may receive a selected mode 542a signal from a mode selection module 106. Both the second signal 522 and the third signal 530 may be integer multiples of the NFC signal 538 carrier frequency 140.

When the selected mode 542a is standalone mode 108 (e.g., the electronic device 102 is performing NFC transmission without an FM reception), then the first divider 544 may divide the first signal 514 by 14 to obtain the second signal 522 with a frequency of 433.92 MHz (i.e., 6074.88 MHz÷14=433.92 MHz). In this case, the second signal frequency 124 is the 32nd multiple of the NFC signal 538 carrier frequency 140.

When the selected mode 542a is coexistence mode 110 (e.g., the electronic device 102 is performing NFC transmission during FM reception), then the first divider 544 may divide the first signal 514 by 16 to obtain the third signal 530 with a frequency of 379.68 MHz (i.e., 6074.88 MHz÷16=379.68 MHz). In this case, the third signal frequency 132 is the 28th multiple of the NFC signal 538 carrier frequency 140.

The first divider 544 may be coupled to a feedback divider 568. The output of the first divider 544 (i.e., the second signal 522 or the third signal 530) may be provided to the feedback divider 568. The output of the first divider 544 may be divided by a value 1/N to produce the feedback signal 569. The value of N may be configurable based on the selected mode 542b. For example, N may have one value when the selected mode 542b is the standalone mode 108 and the feedback divider 568 receives the second signal 522. N may have another value when the selected mode 542b is coexistence mode 110. It should be noted that the PFD charge pump 564, the loop filter 566, the LC VCO 512, the first divider 544 and the feedback divider 568 may form a phase-locked loop (PLL).

The first divider 544 may also be coupled to a waveform generator lookup table (LUT) 548. The waveform generator LUT 548 may receive the output of the first divider 544 (e.g., the second signal 522 or the third signal 530). The waveform generator LUT 548 may include a 32-bit waveform generator LUT 350 and a 28-bit waveform generator LUT 352. The waveform generator LUT 548 may generate the NFC signal 538 based on the selected mode 542c. When the selected mode 542c is the standalone mode 108, then the waveform generator LUT 548 converts the second signal 522 to the NFC signal 538 using the 32-bit waveform generator LUT 350. When the selected mode 542c is the coexistence mode 110, then the waveform generator LUT 548 converts the third signal 530 to the NFC signal 538 using the 28-bit waveform generator LUT 352.

A physical clock divider 570 may be coupled to the output of the first divider 544. The physical clock divider 570 may receive the output of the first divider 544 (i.e., the second signal 522 or the third signal 530). The physical clock divider 570 may generate a physical clock signal 572 with a frequency that is an integer multiple of the NFC signal 538 carrier frequency 140. In this case, the frequency of the physical clock signal 572 may be the 8th multiple of the NFC signal 538 carrier frequency 140.

The physical clock signal 572 may be generated by dividing the second signal 522 or third signal 530 based on the selected mode 542d. When the selected mode 542d is the standalone mode 108, then the physical clock divider 570 may divide the second signal 522 by 4 to generate a physical clock signal 572 that has a frequency of 108.48 MHz (i.e., 433.92 MHz÷4=108.48 MHz). When the selected mode 542d is coexistence mode 110, then the physical clock divider 570 may divide the third signal 530 by 3.5 to generate a physical clock signal 572 that has a frequency of 108.48 MHz (i.e., 379.68 MHz÷3.5=108.48 MHz).

It should be noted that upon dividing the second signal 522 or the third signal 530, the physical clock signal 572 has the same frequency regardless of the selected mode 542b. In other words, the physical clock signal 572 remains constant regardless of the selected mode 542d.

A digital clock divider 574 may be coupled to the output of the physical clock divider 570. The digital clock divider 574 may receive the physical clock signal 572. The digital clock divider 574 may divide the physical clock signal 572 by 2 to generate a digital clock signal 576 that has a frequency of 54.24 MHz (i.e., 108.48 MHz÷2=54.24 MHz). In this case, the frequency of the digital clock signal 576 may be the 4th multiple of the NFC signal 538 carrier frequency 140. As with the physical clock signal 572, it should be noted the digital clock signal 576 remains constant regardless of the selected mode 542.

While FIG. 5 describes an 6074.88 MHz LC VCO 512, other frequencies may be used that are integer multiples of the 433.92 MHz second signal 522 and the 379.68 MHz third signal 530. For example, the LC VCO 512 may have a frequency of 3037.44 MHz, 12149.76 MHz, etc.

The described systems and methods provide several benefits. For example, the synthesizer 504 provides easy frequency tuning. The synthesizer 504 also provides a good area (e.g., size) and power tradeoff. Furthermore, the described synthesizer 504 produces superior phase noise compared to lower-frequency ring VCOs. Additionally, the synthesizer 504 exhibits a simple divider scheme.

Figure 6:
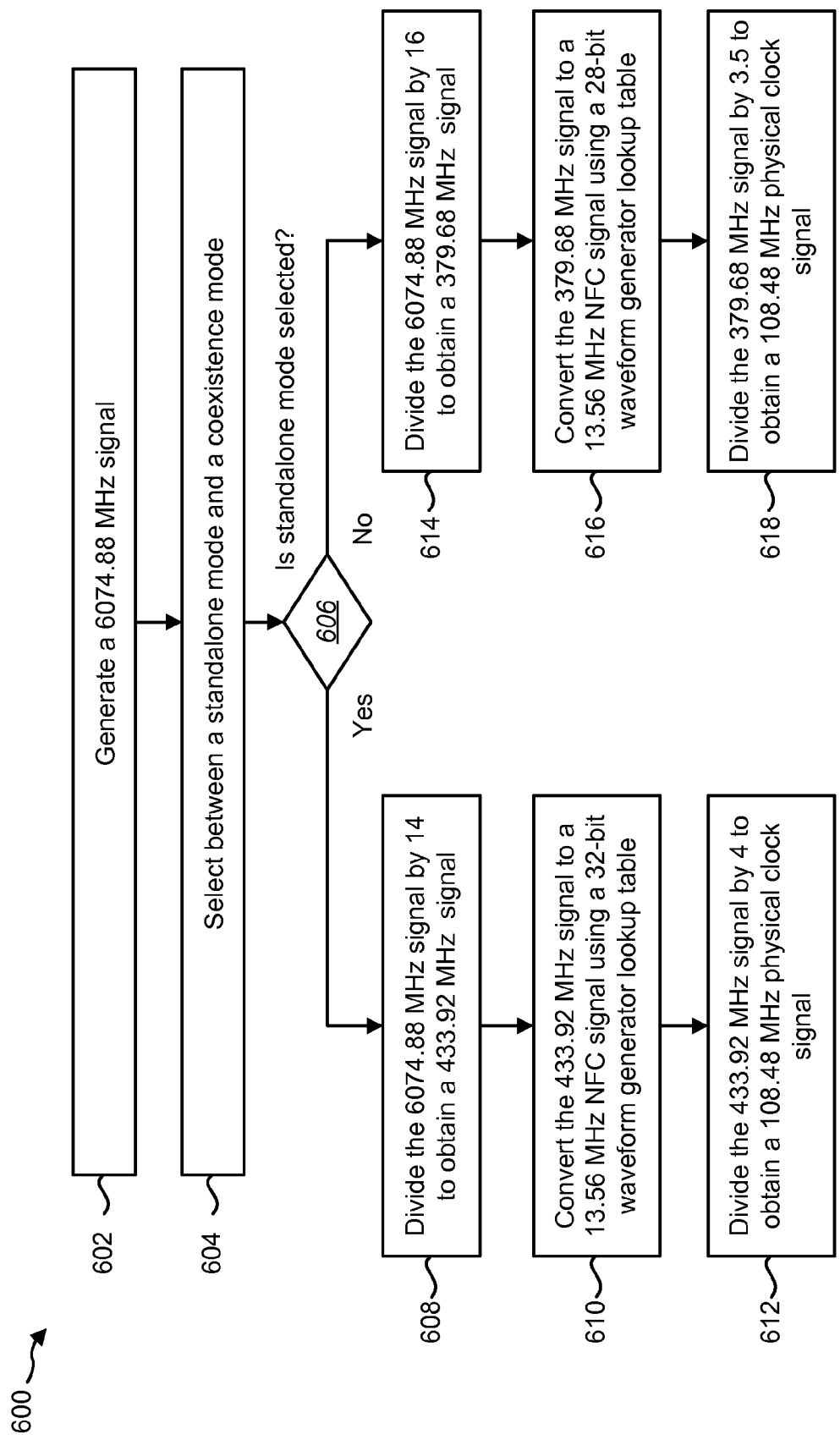
FIG. 6 is a flow diagram illustrating a detailed configuration of a method for reducing transmission interference.

FIG. 6 is a flow diagram illustrating a detailed configuration of a method 600 for reducing transmission interference. In one implementation, an electronic device 402 may perform the method 600 illustrated in FIG. 6 in order to mitigate FM desensitization by a near-field communication (NFC) transmission.

The electronic device 402 may generate 602 a 6074.88 MHz signal. For example, the electronic device 402 may generate 602 the 6074.88 MHz using an inductor capacitor (LC) voltage controlled oscillator (VCO) as part of a phase locked loop (PLL). The 6074.88 MHz signal frequency is the 448th multiple of the NFC signal 438 carrier frequency 140 (i.e., 13.56 MHz*448=6074.88 MHz).

The electronic device 402 may select 604 between a standalone mode 108 and a coexistence mode 110. The electronic device 402 may select 604 standalone mode 108 when performing NFC transmission without FM reception. Alternatively, the electronic device 402 may select 604 coexistence mode 110 when performing NFC transmission during FM reception.

The electronic device 402 may determine 606 whether standalone mode 108 is selected. If standalone mode 108 is selected, then the electronic device 402 may divide 608 the 6074.88 MHz signal by 14 to obtain a 433.92 MHz signal. In this case, the 433.92 MHz signal is the 32nd multiple of the 13.56 MHz NFC signal 438 (i.e., 13.56 MHz*32=433.92 MHz). The electronic device 402 may convert 610 the 433.92 MHz signal to the 13.56 MHz NFC signal 438 using a 32-bit waveform generator lookup table 350.

The electronic device 402 may divide 612 the 433.92 MHz signal by 4 to obtain a 108.48 MHz physical clock signal 572. In this case, the frequency of the physical clock signal 572 is the 8th multiple of the NFC signal 438 carrier frequency 140 (i.e., 13.56 MHz*8=108.48 MHz).

If the electronic device 402 determines 606 that standalone mode 108 is not selected (i.e., coexistence mode 110 is selected), then the electronic device 402 may divide 614 the 6074.88 MHz signal by 16 to obtain a 379.68 MHz signal. In this case, the 379.68 MHz signal is the 28th multiple of the 13.56 MHz NFC signal 438 (i.e., 13.56 MHz*28=379.68 MHz). The electronic device 402 may convert 616 the 379.68 MHz signal to the 13.56 MHz NFC signal 438 using a 28-bit waveform generator lookup table 352.

The electronic device 402 may divide 618 the 379.68 MHz signal by 3.5 to obtain a 108.48 MHz physical clock signal 572. In this case, the frequency of the physical clock signal 572 is the 8th multiple of the NFC signal 438 carrier frequency 140 (i.e., 13.56 MHz*8=108.48 MHz).

Figure 7:
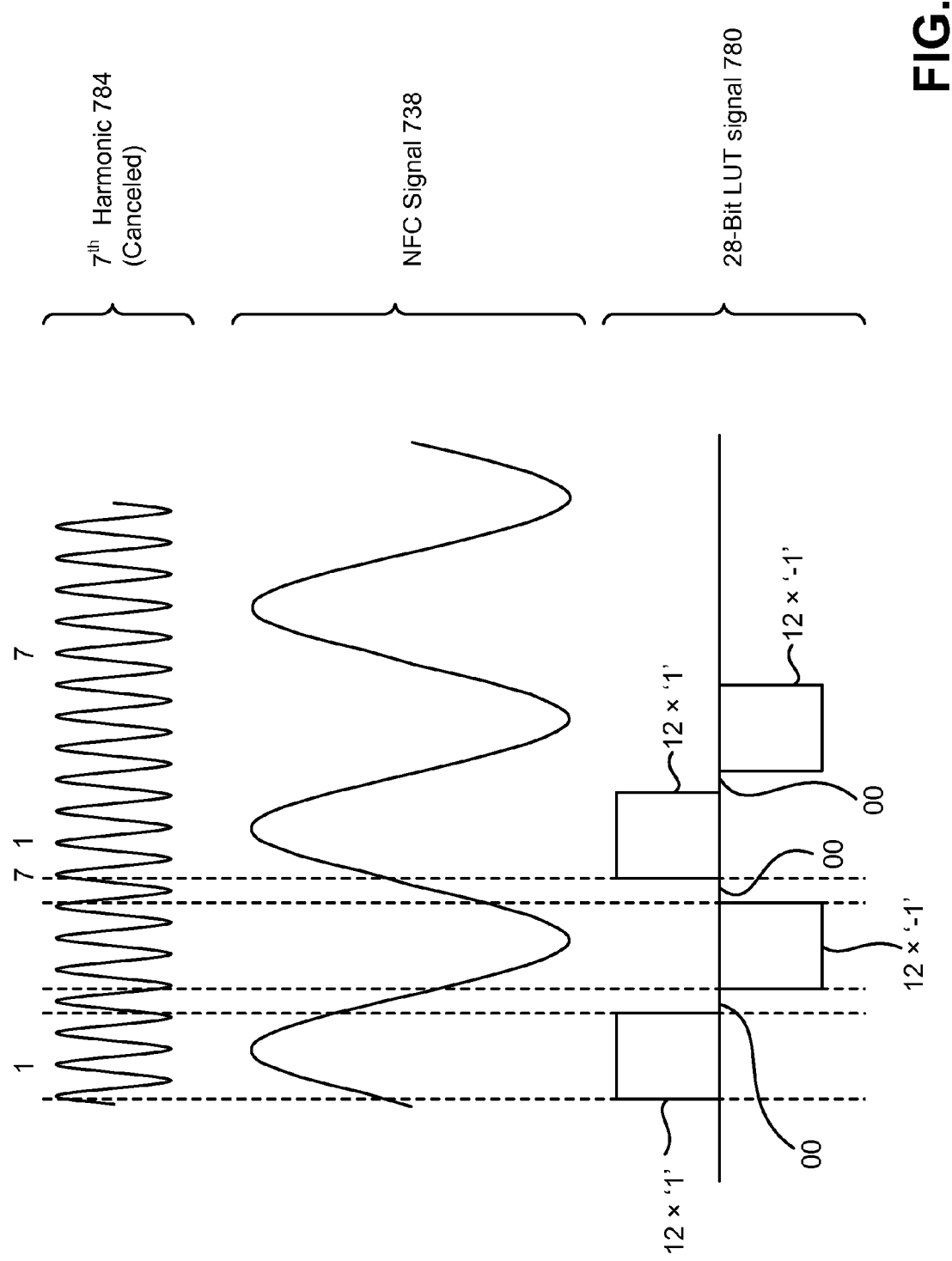
FIG. 7 is a graph illustrating the generation of a near-field communication (NFC) signal using a 28-bit lookup table (LUT) signal.

FIG. 7 is a graph illustrating the generation of a near-field communication (NFC) signal 738 using a 28-bit lookup table (LUT) signal 780. In the case of NFC, the NFC signal 738 may be a sine wave with a 13.56 MHz carrier frequency 140. In one configuration, a 28-bit waveform generator LUT 352 may receive a 379.68 MHz signal, which is the 28th multiple of the 13.56 MHz carrier frequency 140. With a 379.68 MHz signal, 28 phases are available to generate a 13.57 MHz signal.

The 28-bit waveform generator LUT 352 may generate the 28-bit LUT signal 780 using the high frequency 379.68 MHz signal. The 28-bit LUT signal 780 may be a square wave that has a 28-bit long pattern. The 28-bit LUT signal 780 may have a positive phase (i.e., '1'), a negative phase (e.g., '−1') or may be zero. One solution to generate the NFC signal 738 is for the 28-bit LUT signal 780 to have the following pattern: 12×'1', 2×'0' 12×'−1', 2×'0' of 379.68 MHz cycles. Other solutions are discussed in connection with FIG. 8. The fundamental sine wave of the NFC signal 738 may be generated by passing the 28-bit LUT signal 780 through a band pass system.

Using a Fourier expansion with the 28-bit LUT signal 780, the coefficient of the 7th harmonic 784 of the NFC signal 738 may be set to '0'. An example of setting the coefficient of the 7th harmonic 784 to '0' is described in connection with FIG. 8.

By setting the coefficient of the 7th harmonic 784 to '0' and using the 28-bit LUT signal 780, the 7th harmonic 784 may be canceled. In other words, the length of the LUT may be adjusted in the waveform generator so that a LUT pattern is chosen that directly cancels the 7th harmonic 784. Once canceled, the 7th harmonic 784 will not interfere with FM reception.

It should be noted, that cancellation of the 7th harmonic 784 using a number of phases other than 28 may not be effective. For example, using 32 phases (associated with a 433.92 MHz signal, for example) will not provide cancellation of the 7th harmonic 784. Therefore, an NFC signal 738 generated with a 433.92 MHz signal may have significant 7th harmonics 784.

Figure 8:
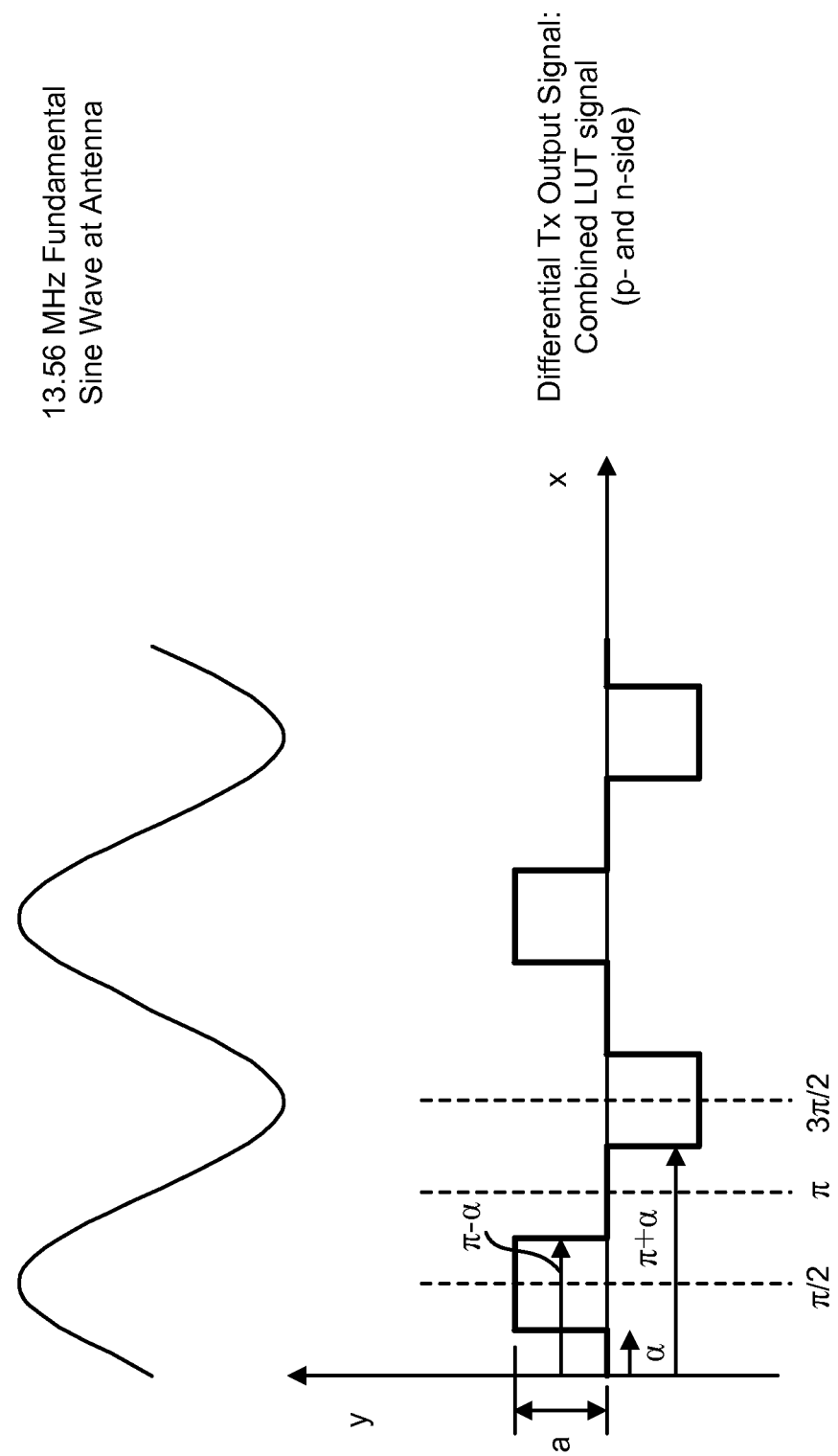
FIG. 8 illustrates configurations for cancelling a 7th harmonic with a 28-bit LUT.

FIG. 8 illustrates configurations for cancelling a 7th harmonic 784 with a 28-bit LUT. The differential transmission (Tx) output signal produced by a waveform generator LUT 348 may be characterized by the Fourier expansion of Equation (1).

$$y = 4a \Big/ \pi \begin{bmatrix} \cos(\alpha) \cdot \sin(x) + \\ 1/3 \cdot \cos(3\alpha) \cdot \sin(3x) + \\ 1/5 \cdot \cos(5\alpha) \cdot \sin(5x) + \\ 1/7 \cdot \cos(7\alpha) \cdot \sin(7x) + \dots \end{bmatrix} \quad (1)$$

In Equation (1), $\alpha$ is the absolute magnitude of the wave. The coefficient $\alpha$ is a number of bits that characterizes the square wave used by the LUT. In Equation (1), the 7th harmonic 784 corresponds to $1/7 \cdot \cos(7\alpha) \cdot \sin(7x)$. To remove the 7th harmonic 784, $\alpha$ may be selected such that $$1/7 \cdot \cos(7\alpha) = 0 \quad (2)$$

For a 28-bit pattern, $\pi$=14 bits. Therefore, for a 28-bit pattern, there are three solutions for Equation (2) that may be used to simulate the fundamental sine wave.

In a first solution, $7\alpha = \pi/2 = 14/2$ bits. Therefore, in the first solution, $\alpha=1$ bit.

In a second solution, $7\alpha = 3\pi/2 = 3*14/2$ bits. Therefore, in the second solution, $\alpha=3$ bits.

In a third solution, $7\alpha = 5\pi/2 = 5*14/2$ bits. Therefore, in the third solution, $\alpha=5$ bits.

Table 1 illustrates three patterns for a LUT in which $\alpha$ is set to 1, 3 and 5, respectively. The patterns may be used by a waveform generator LUT 348 to create a fundamental sine wave without any 7th order component.

TABLE 1

| $\alpha$ | 28-Bit Pattern |
|---|---|
| 1 | 0 1 1 1 1 1 1 1 1 1 1 1 1 1 1 1 0 0 −1 −1 −1 −1 −1 −1 −1 −1 −1 −1 −1 −1 −1 −1 0 |
| 3 | 0 0 0 1 1 1 1 1 1 1 1 1 0 0 0 0 0 0 −1 −1 −1 −1 −1 −1 −1 −1 −1 0 0 0 |
| 5 | 0 0 0 0 0 1 1 1 1 0 0 0 0 0 0 0 0 0 0 −1 −1 −1 −1 −1 0 0 0 0 0 0 |

Figure 9:
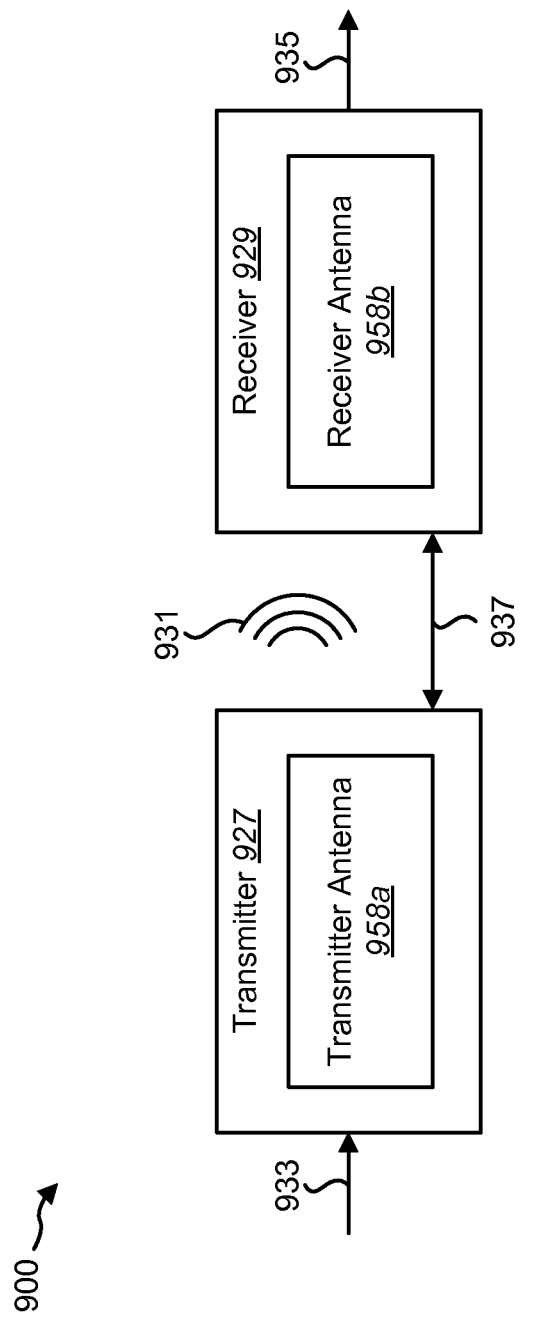
FIG. 9 is a block diagram illustrating one configuration of inductively coupled communication in a wireless communication system.

FIG. 9 is a block diagram illustrating one configuration of inductively coupled communication in a wireless communication system 900. In one configuration, the inductively coupled communication technology may be near-field communication (NFC).

Input power 933 is provided to a transmitter 927 for generating a radiated field 931 for providing energy transfer. A receiver 929 couples to the radiated field 931 and generates an output power 935 for storing or consumption by a device (not shown) coupled to the output power 935. Both the transmitter 927 and the receiver 929 are separated by a distance 937. In one exemplary configuration, the transmitter 927 and receiver 929 are configured according to a mutual resonant relationship, such that when the resonant frequency of the receiver 929 and the resonant frequency of transmitter 927 are very close, transmission losses between the transmitter 927 and the receiver 929 are minimal when the receiver 929 is located in the "near-field" of the radiated field 931.

The transmitter 927 further includes a transmit antenna 958a for providing a means for energy transmission and the receiver 929 further includes a receive antenna 958b for providing a means for energy reception. An efficient energy transfer may occur by coupling a large portion of the energy in the near-field of the transmitting antenna 958a to a receiving antenna 958b rather than propagating most of the energy in an electromagnetic wave to the far field. When in this near-field, a coupling mode may be developed between the transmit antenna 958a and the receive antenna 958b. The area around the transmit antenna 958a and the receive antenna 958b where this near-field coupling may occur is referred to as a coupling-mode region.

Figure 10:
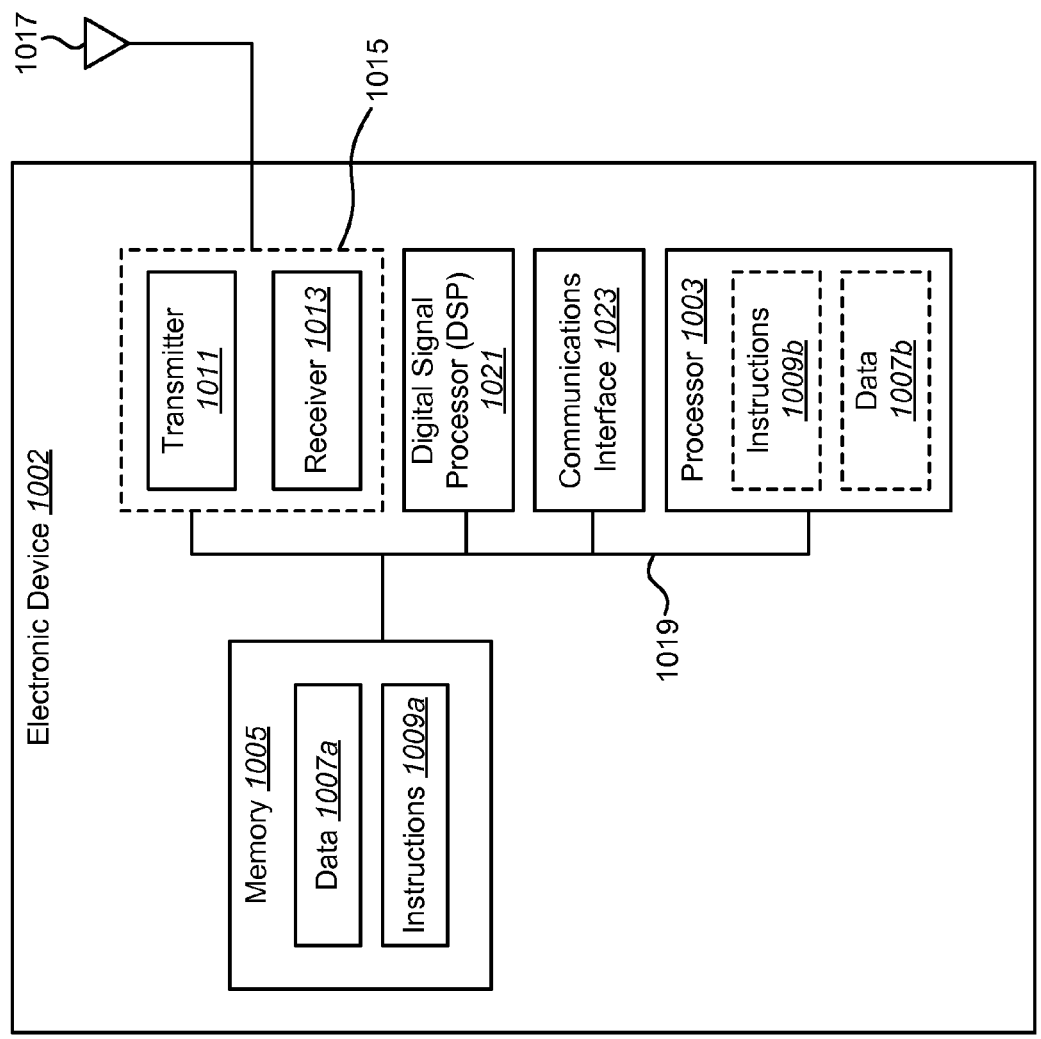
FIG. 10 illustrates certain components that may be included within an electronic device.

FIG. 10 illustrates certain components that may be included within an electronic device 1002. The electronic device 1002 may be an access terminal, a mobile station, a user equipment (UE), etc. For example, the electronic device 1002 may be the electronic device 102 of FIG. 1.

The electronic device 1002 includes a processor 1003. The processor 1003 may be a general purpose single-or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1003 may be referred to as a central processing unit (CPU). Although just a single processor 1003 is shown in the electronic device 1002 of FIG. 10, in an alternative configuration, a combination of processors (e.g., an ARM and DSP) could be used.

The electronic device 1002 also includes memory 1005 in electronic communication with the processor (i.e., the processor can read information from and/or write information to the memory). The memory 1005 may be any electronic component capable of storing electronic information. The memory 1005 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1007a and instructions 1009a may be stored in the memory 1005. The instructions may include one or more programs, routines, sub-routines, functions, procedures, code, etc. The instructions may include a single computer-readable statement or many computer-readable statements. The instructions 1009a may be executable by the processor 1003 to implement the methods disclosed herein. Executing the instructions 1009a may involve the use of the data 1007a that is stored in the memory 1005. When the processor 1003 executes the instructions 1009, various portions of the instructions 1009b may be loaded onto the processor 1003, and various pieces of data 1007b may be loaded onto the processor 1003.

The electronic device 1002 may also include a transmitter 1011 and a receiver 1013 to allow transmission and reception of signals to and from the electronic device 1002 via an antenna 1017. The transmitter 1011 and receiver 1013 may be collectively referred to as a transceiver 1015. The electronic device 1002 may also include (not shown) multiple transmitters, multiple antennas, multiple receivers and/or multiple transceivers.

The electronic device 1002 may include a digital signal processor (DSP) 1021. The electronic device 1002 may also include a communications interface 1023. The communications interface 1023 may allow a user to interact with the electronic device 1002.

The various components of the electronic device 1002 may be coupled together by one or more buses, which may include a power bus, a control signal bus, a status signal bus, a data bus, etc. For the sake of clarity, the various buses are illustrated in FIG. 10 as a bus system 1019.

In the above description, reference numbers have sometimes been used in connection with various terms. Where a term is used in connection with a reference number, this may be meant to refer to a specific element that is shown in one or more of the figures. Where a term is used without a reference number, this may be meant to refer generally to the term without limitation to any particular figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2 and FIG. 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for inductively coupled communication, comprising:
generating a first signal, wherein a first signal frequency is a first integer multiple of a carrier frequency for inductively coupled communication;
selecting between a standalone mode and a coexistence mode;
dividing the first signal to obtain a second signal when in standalone mode, wherein a second signal frequency is a second integer multiple of the carrier frequency;
dividing the first signal to obtain a third signal when in coexistence mode, wherein a third signal frequency is a third integer multiple of the carrier frequency; and
generating an inductively coupled communication signal using at least one of the second signal and the third signal.

2. The method of claim 1, wherein selecting between the standalone mode and the coexistence mode comprises:
selecting standalone mode when performing inductively coupled communication transmission without an FM reception; and
selecting coexistence mode when performing inductively coupled communication transmission during FM reception.

3. The method of claim 1, wherein when the coexistence mode is selected, generating the inductively coupled communication signal comprises converting the third signal to the inductively coupled communication signal using a 28-bit waveform generator lookup table.

4. The method of claim 3, wherein a frequency of the inductively coupled communication signal is the carrier frequency.

5. The method of claim 3, wherein a seventh harmonic of the inductively coupled communication signal is canceled using the 28-bit waveform generator lookup table.

6. The method of claim 1, wherein when the standalone mode is selected, generating the inductively coupled communication signal comprises converting the second signal to the inductively coupled communication signal using a 32-bit waveform generator lookup table.

7. The method of claim 1, further comprising:
generating a physical clock signal with a frequency that is an integer multiple of the carrier frequency, wherein the physical clock signal is generated by dividing the second signal or third signal based on the selected mode; and
generating a digital clock signal with a frequency that is an integer multiple of the carrier frequency, wherein the digital clock signal is generated by dividing the physical clock signal.

8. The method of claim 1, wherein dividing the first signal to obtain either the second signal or the third signal comprises adjusting one or more programmable dividers based on the selected mode.

9. The method of claim 1, wherein the inductively coupled communication is near field communication (NFC).

10. The method of claim 9, wherein the carrier frequency is 13.56 megahertz (MHz), the first signal frequency is 6074.88 MHz, the second signal frequency is 433.92 MHz and the third signal frequency is 379.68 MHz.

11. Circuitry for inductively coupled communication, comprising:
a signal generator that generates a first signal, wherein a first signal frequency is a first integer multiple of a carrier frequency for inductively coupled communication;
a mode selection module that selects between a standalone mode and a coexistence mode;
a standalone divider that divides the first signal to obtain a second signal when in standalone mode, wherein a second signal frequency is a second integer multiple of the carrier frequency;
a coexistence divider that divides the first signal to obtain a third signal when in coexistence mode, wherein a third signal frequency is a third integer multiple of the carrier frequency; and
an inductively coupled communication signal generator that generates an inductively coupled communication signal using at least one of the second signal and the third signal.

12. The circuitry of claim 11, wherein the mode selection module selects standalone mode when an electronic device is performing inductively coupled communication transmission without an FM reception; and the mode selection module selects coexistence mode when the electronic device is performing inductively coupled communication transmission during FM reception.

13. The circuitry of claim 11, wherein when the coexistence mode is selected, the inductively coupled communication signal generator converts the third signal to the inductively coupled communication signal using a 28-bit waveform generator lookup table.

14. The circuitry of claim 13, wherein a frequency of the inductively coupled communication signal is the carrier frequency.

15. The circuitry of claim 13, wherein a seventh harmonic of the inductively coupled communication signal is canceled using the 28-bit waveform generator lookup table.

16. The circuitry of claim 11, wherein when the standalone mode is selected, the inductively coupled communication signal generator converts the second signal to the inductively coupled communication signal using a 32-bit waveform generator lookup table.

17. The circuitry of claim 11, further comprising:
a physical clock divider that generates a physical clock signal by dividing the second signal or third signal based on the selected mode, wherein the physical clock signal has a frequency that is an integer multiple of the carrier frequency; and a digital clock divider that generates a digital clock signal by dividing the physical clock signal, wherein the digital clock signal has a frequency that is an integer multiple of the carrier frequency.

18. An apparatus for inductively coupled communication, comprising:
    means for generating a first signal, wherein a first signal frequency is a first integer multiple of a carrier frequency for inductively coupled communication;
    means for selecting between a standalone mode and a coexistence mode;
    means for dividing the first signal to obtain a second signal when in standalone mode, wherein a second signal frequency is a second integer multiple of the carrier frequency;
    means for dividing the first signal to obtain a third signal when in coexistence mode, wherein a third signal frequency is a third integer multiple of the carrier frequency; and
    means for generating an inductively coupled communication signal using at least one of the second signal and the third signal.

19. The apparatus of claim 18, wherein the means for selecting between the standalone mode and the coexistence mode comprise:
    means for selecting standalone mode when performing inductively coupled communication transmission without an FM reception; and
    means for selecting coexistence mode when performing inductively coupled communication transmission during FM reception.

20. The apparatus of claim 18, wherein when the coexistence mode is selected, the means for generating the inductively coupled communication signal comprise means for converting the third signal to the inductively coupled communication signal using a 28-bit waveform generator lookup table.

21. The apparatus of claim 20, wherein a frequency of the inductively coupled communication signal is the carrier frequency.

22. The apparatus of claim 20, wherein a seventh harmonic of the inductively coupled communication signal is canceled using the 28-bit waveform generator lookup table.

23. The apparatus of claim 18, wherein when the standalone mode is selected, the means for generating the inductively coupled communication signal comprise means for converting the second signal to the inductively coupled communication signal using a 32-bit waveform generator lookup table.

24. The apparatus of claim 18, further comprising:
    means for generating a physical clock signal with a frequency that is an integer multiple of the carrier frequency, wherein the physical clock signal is generated by dividing the second signal or third signal based on the selected mode; and
    means for generating a digital clock signal with a frequency that is an integer multiple of the carrier frequency, wherein the digital clock signal is generated by dividing the physical clock signal.

25. A computer-program product for inductively coupled communication, comprising a non-transitory tangible computer-readable medium having instructions thereon, the instructions comprising:
    code for causing an electronic device to generate a first signal, wherein a first signal frequency is a first integer multiple of a carrier frequency for inductively coupled communication;
    code for causing the electronic device to select between a standalone mode and a coexistence mode;
    code for causing the electronic device to divide the first signal to obtain a second signal when in standalone mode, wherein a second signal frequency is a second integer multiple of the carrier frequency;
    code for causing the electronic device to divide the first signal to obtain a third signal when in coexistence mode, wherein a third signal frequency is a third integer multiple of the carrier frequency; and
    code for causing the electronic device to generate an inductively coupled communication signal using at least one of the second signal and the third signal.

26. The computer-program product of claim 25, wherein the code for causing the electronic device to select between a standalone mode and a coexistence mode comprises:
    code for causing the electronic device to select standalone mode when performing inductively coupled communication transmission without an FM reception; and
    code for causing the electronic device to select coexistence mode when performing inductively coupled communication transmission during FM reception.

27. The computer-program product of claim 25, wherein when the coexistence mode is selected, the code for causing the electronic device to generate the inductively coupled communication signal comprises code for causing the electronic device to convert the third signal to the inductively coupled communication signal using a 28-bit waveform generator lookup table.

28. The computer-program product of claim 27, wherein a frequency of the inductively coupled communication signal is the carrier frequency.

29. The computer-program product of claim 27, wherein a seventh harmonic of the inductively coupled communication signal is canceled using the 28-bit waveform generator lookup table.

30. The computer-program product of claim 25, further comprising:
    code for causing the electronic device to generate a physical clock signal with a frequency that is an integer multiple of the carrier frequency, wherein the physical clock signal is generated by dividing the second signal or third signal based on the selected mode; and
    code for causing the electronic device to generate a digital clock signal with a frequency that is an integer multiple of the carrier frequency, wherein the digital clock signal is generated by dividing the physical clock signal.

* * * * *